Figure 1:
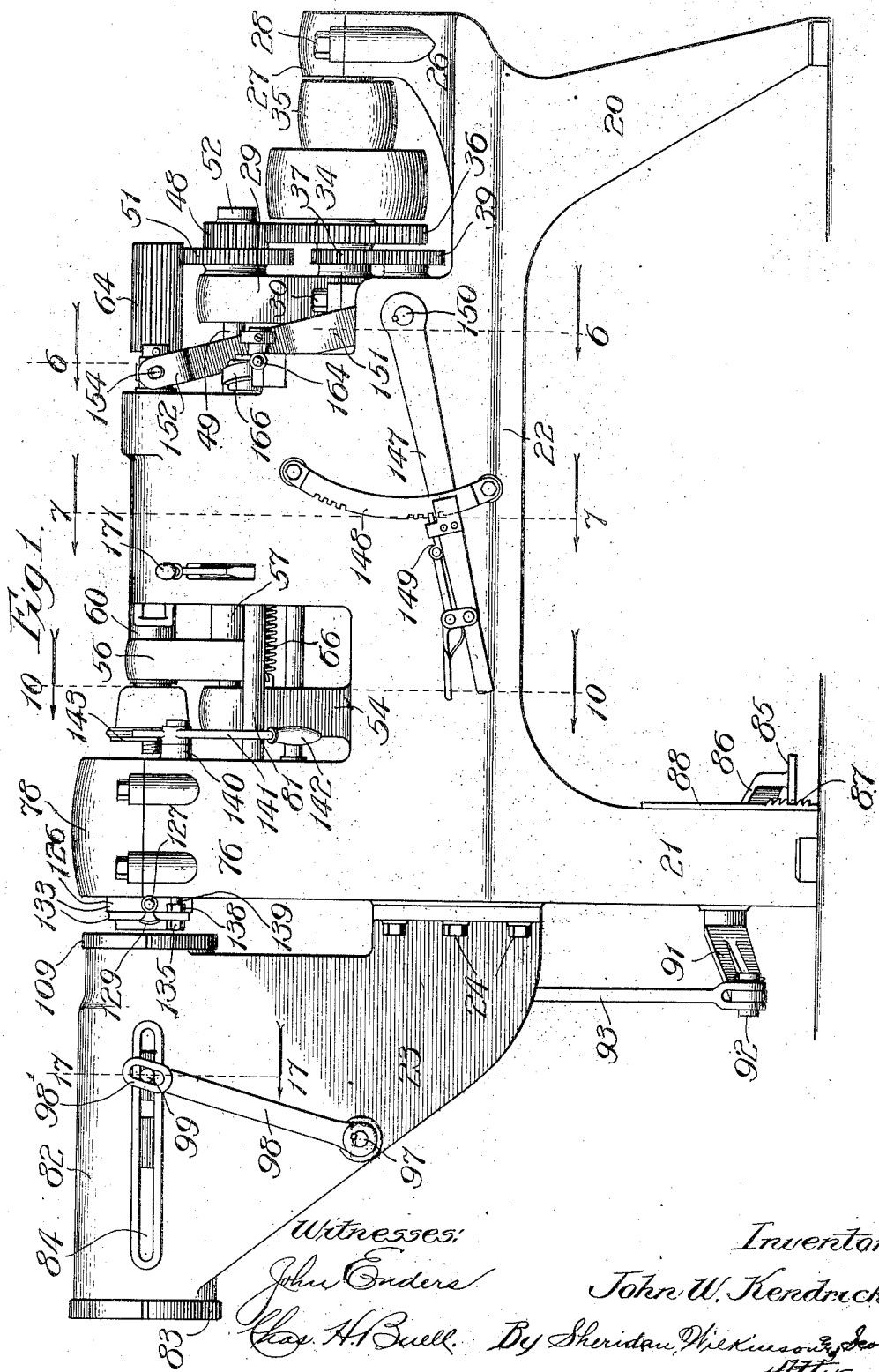

J. W. KENDRICK.
MACHINE FOR MAKING PLUGS FOR RAILWAY TIES.
APPLICATION FILED APR. 22, 1909.

1,063,697.

Patented June 3, 1913.

10 SHEETS—SHEET 3.

Fig. 3.

Witnesses:
John Enders
Chas. H. Buell

Inventor:
John W. Kendrick
By Sheridan, Wilkinson & Scott,
Attys.

J. W. KENDRICK.
MACHINE FOR MAKING PLUGS FOR RAILWAY TIES.
APPLICATION FILED APR. 22, 1909.

1,063,697.

Patented June 3, 1913.
10 SHEETS—SHEET 4.

Witnesses:
John Enders
Chas. H. Buell.

Inventor:
John W. Kendrick
By Sheridan, Wilkinson & Scott,
Attys.

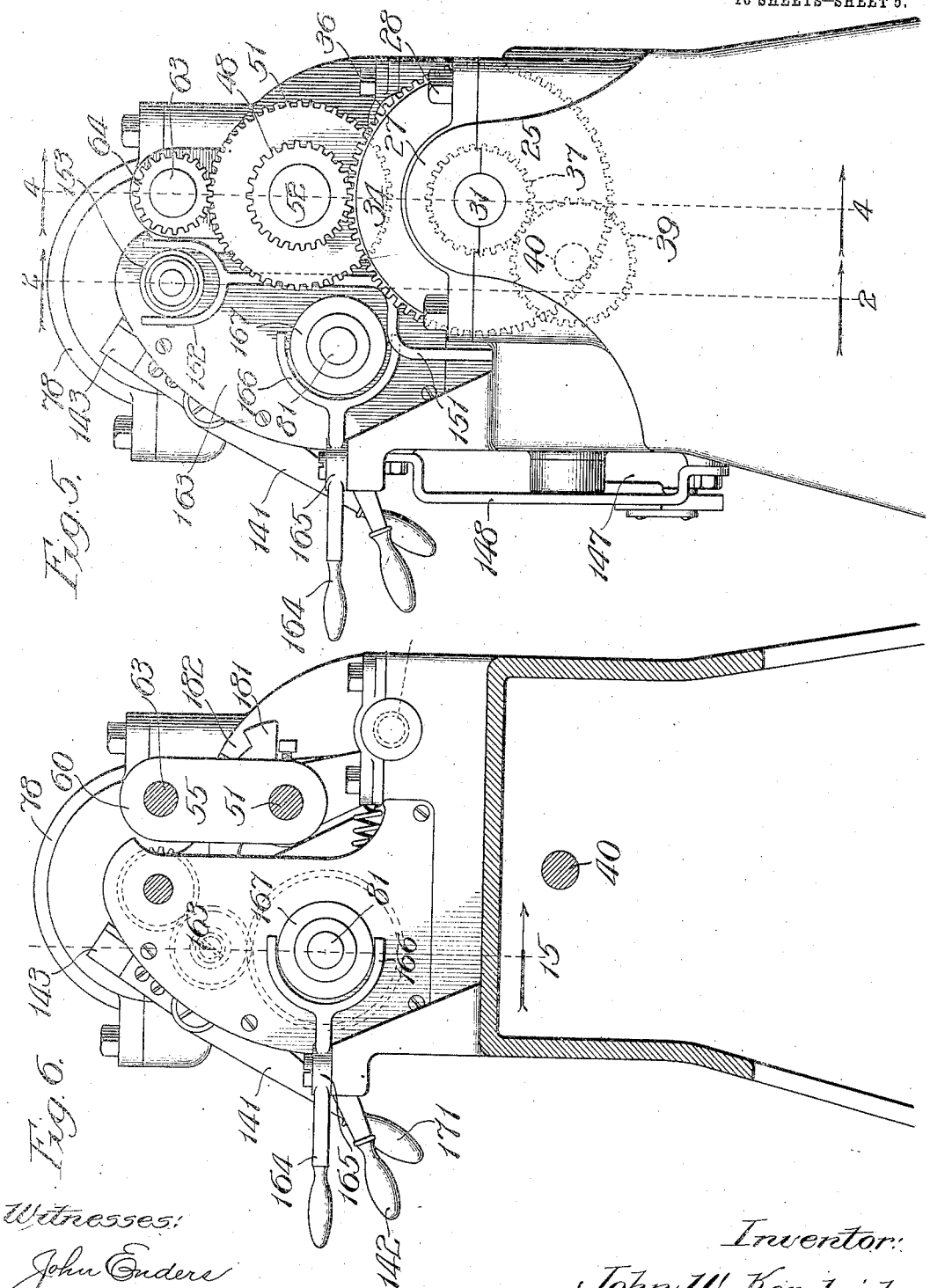

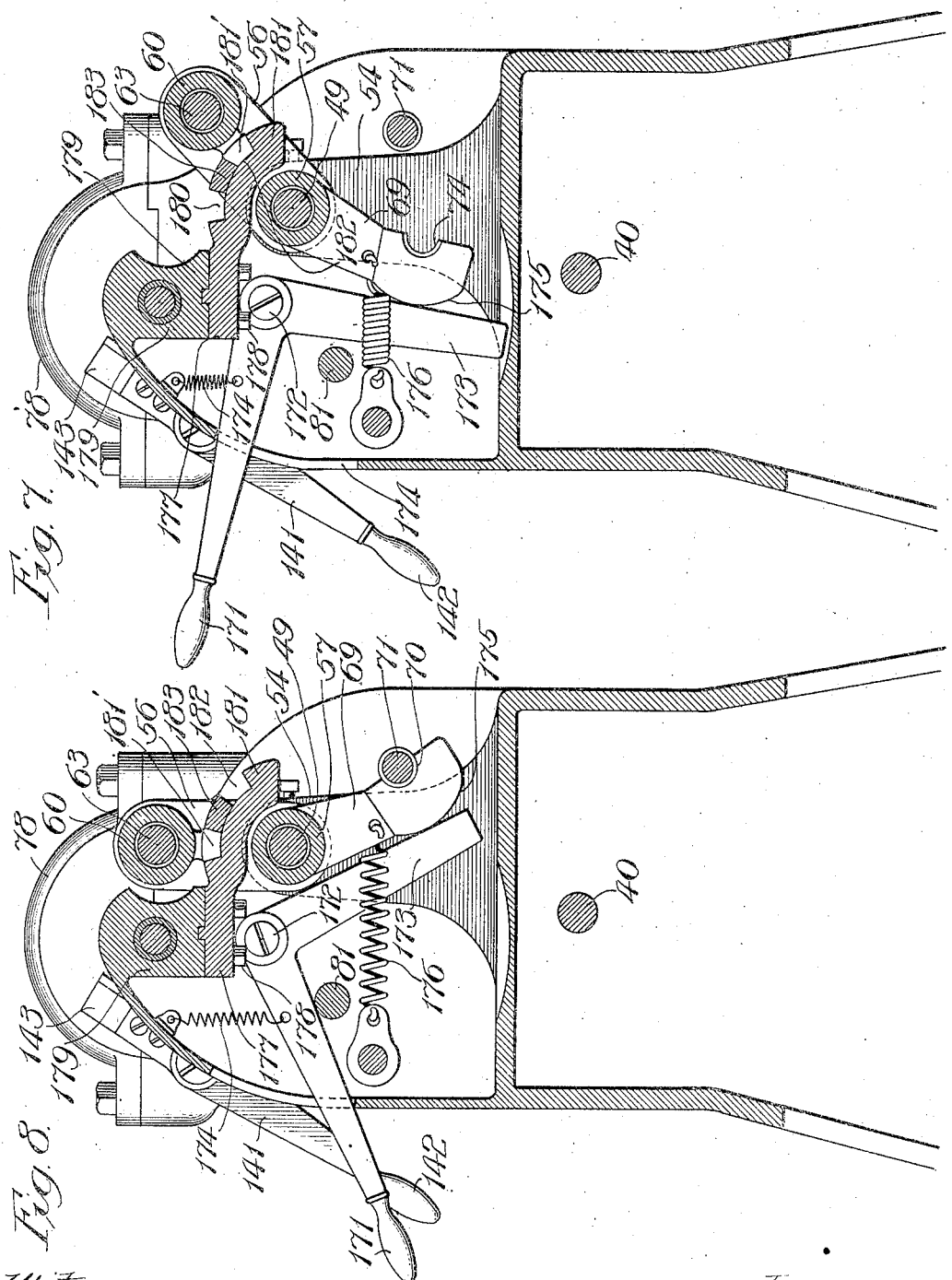

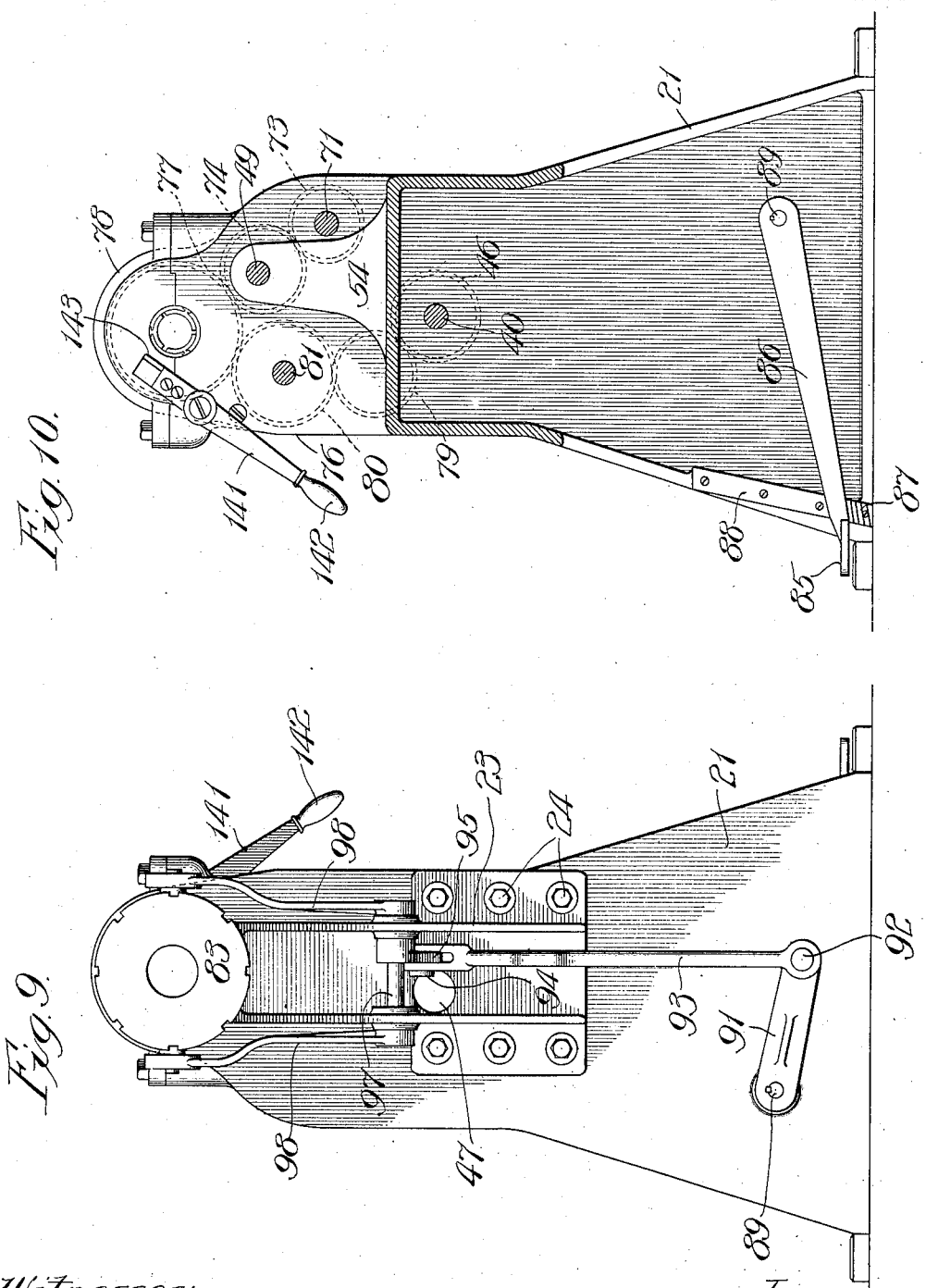

J. W. KENDRICK.
MACHINE FOR MAKING PLUGS FOR RAILWAY TIES.
APPLICATION FILED APR. 22, 1909.

1,063,697.

Patented June 3, 1913.
10 SHEETS—SHEET 8.

Witnesses:
John Enders
Chas. H. Buell

Inventor:
John W. Kendrick
By Sheridan, Wilkinson & Scott
Attys.

J. W. KENDRICK.
MACHINE FOR MAKING PLUGS FOR RAILWAY TIES.
APPLICATION FILED APR. 22, 1909.
1,063,697.
Patented June 3, 1913.
10 SHEETS—SHEET 9.
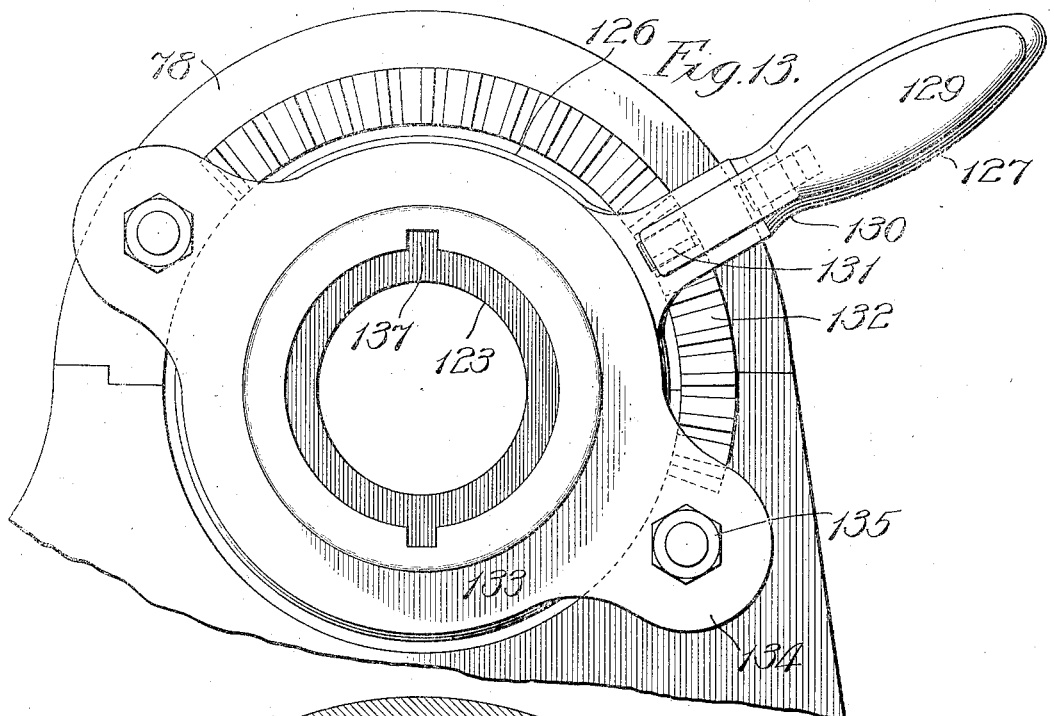
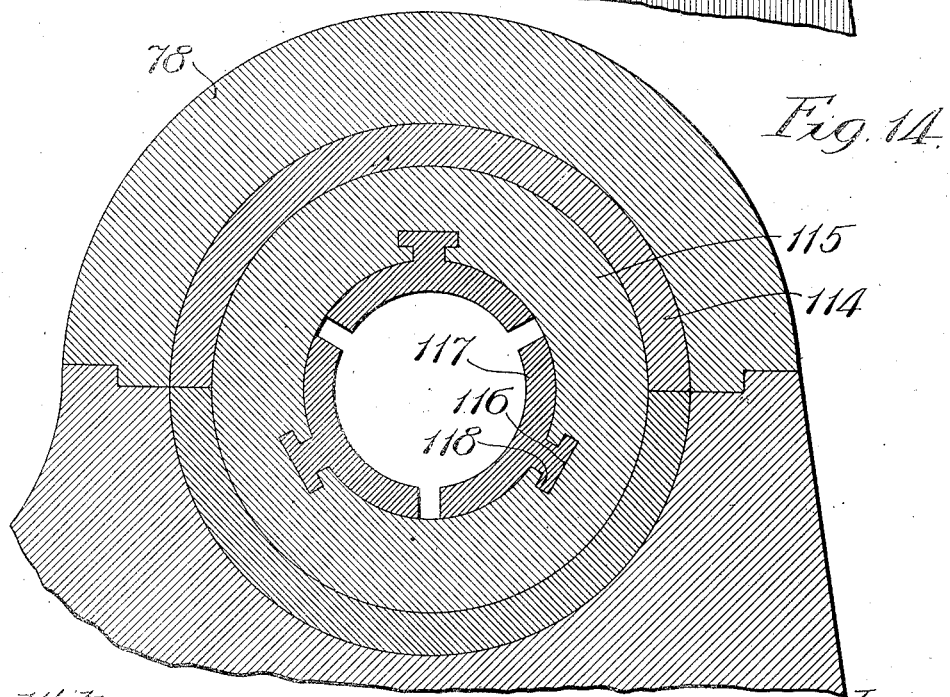
Witnesses:
John Enders
Chas. H. Buell
Inventor:
John W. Kendrick.
By Sheridan, Wilkinson & Scott
Attys.

J. W. KENDRICK.
MACHINE FOR MAKING PLUGS FOR RAILWAY TIES.
APPLICATION FILED APR. 22, 1909.
1,063,697.
Patented June 3, 1913.
10 SHEETS—SHEET 10.
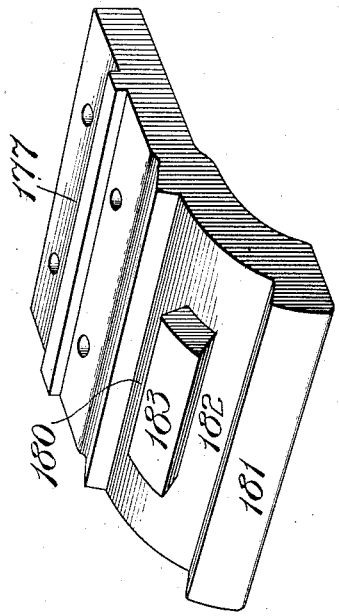
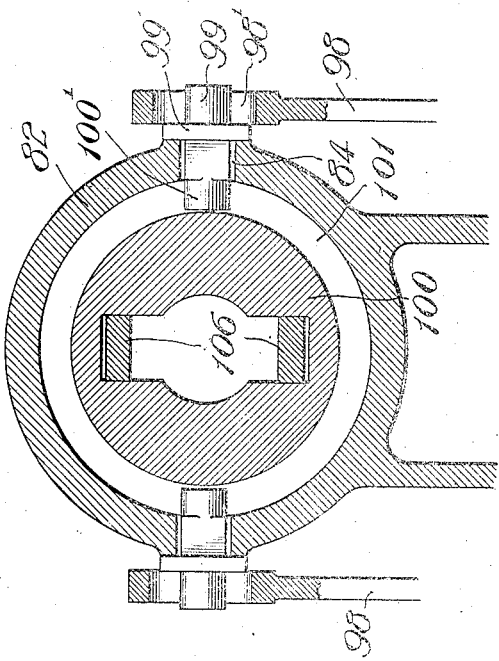
Witnesses:
John Enders
Chas. H. Buell
Inventor:
John W. Kendrick
By Sheridan, Wilkinson & Scott
Attys

UNITED STATES PATENT OFFICE.

JOHN W. KENDRICK, OF CHICAGO, ILLINOIS.

MACHINE FOR MAKING PLUGS FOR RAILWAY-TIES.

1,063,697.   Specification of Letters Patent.   Patented June 3, 1913.

Application filed April 22, 1909. Serial No. 491,485.

*To all whom it may concern:*

Be it known that I, JOHN W. KENDRICK, a citizen of the United States, residing at Chicago, in the county of Cook and State of Illinois, have invented certain new and useful Improvements in Machines for Making Plugs for Railway-Ties, of which the following is a specification.

The principal object of my invention is to provide a machine for making wooden plugs to be used in renewing railroad ties.

It is well known that when railroad ties give out or become useless, it is generally due to rotting or loosening of the wood around the spikes. Until somewhat recently, this has rendered the ties useless, although the rest of the ties might be perfectly sound, but the following method has been practised recently in order to prolong the life of the ties: The ties are removed from under the rails, the old spike holes are bored out and tapped with screw threads, wooden plugs are screwed down into these holes, their top ends are cut off flush with the surface of the ties, the ties are then replaced under the rails and metal screw spikes are driven down into the plugs. In this way, the ties are made to last several years longer. The plugs have the appearance shown in Figure 12 of the drawings. The plug is not only screw threaded on the outside, but has an axial hole bored in it to receive the metal spike.

Another object of my invention is to provide a machine adapted to make screw spikes as just described from stock consisting of plain wooden rods.

Various other objects of my invention will be more readily made apparent in the following specification and claims, taken in connection with the accompanying drawings, in which one specific embodiment of my invention is illustrated.

My invention consists of the combination of elements stated in the appended claims.

Figure 2:
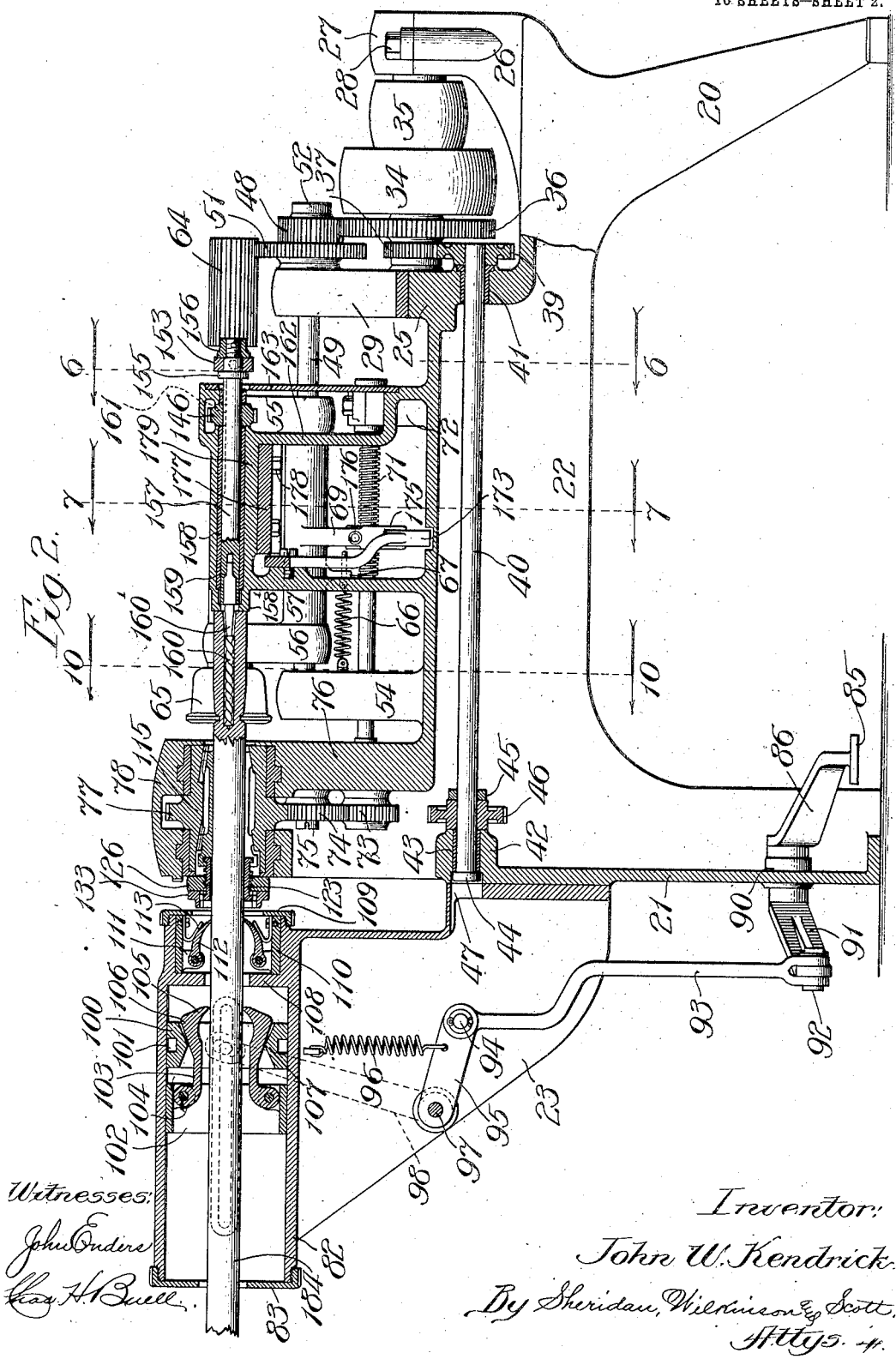
Figure 4:
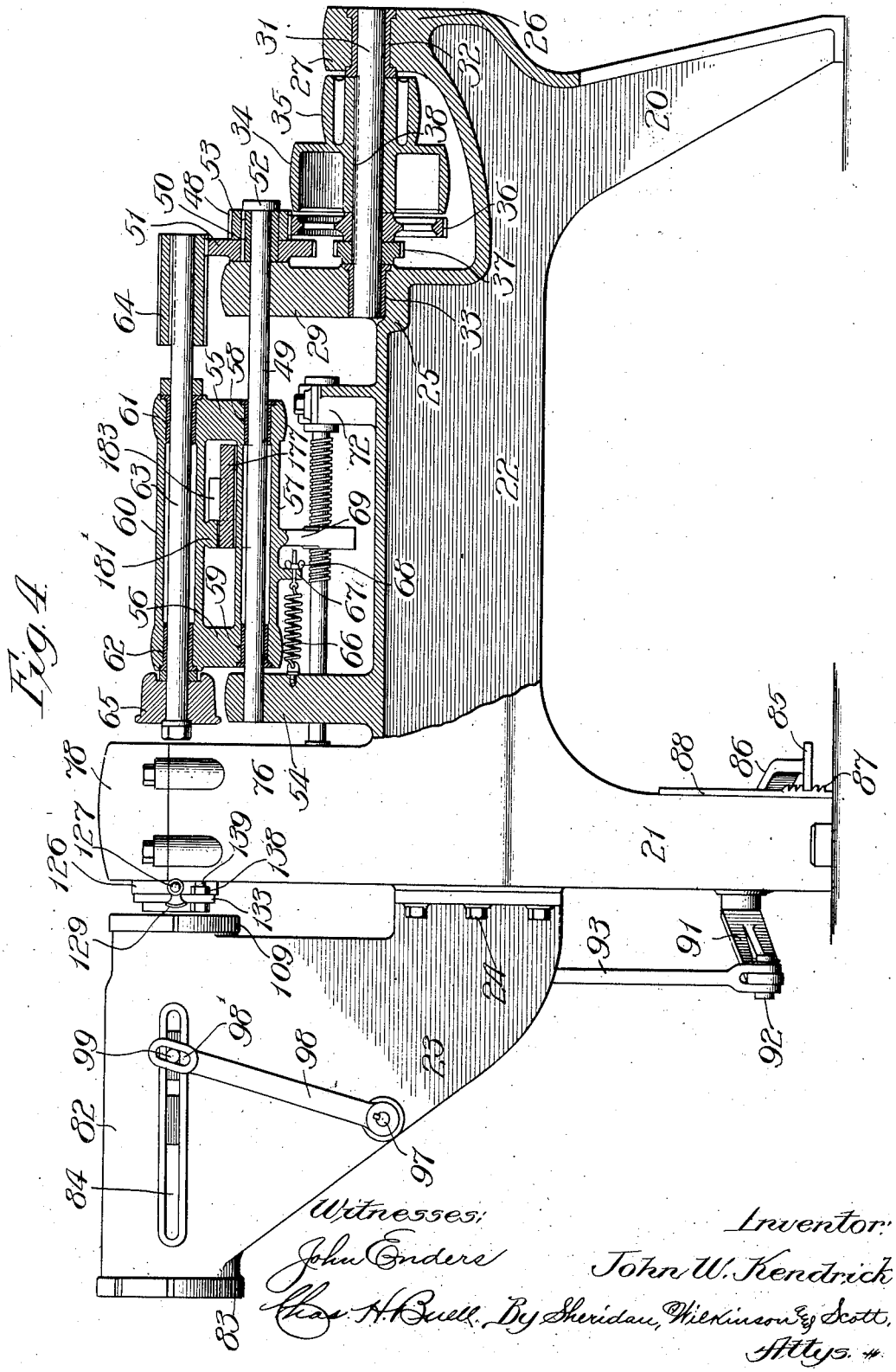
Figures 11, 12:
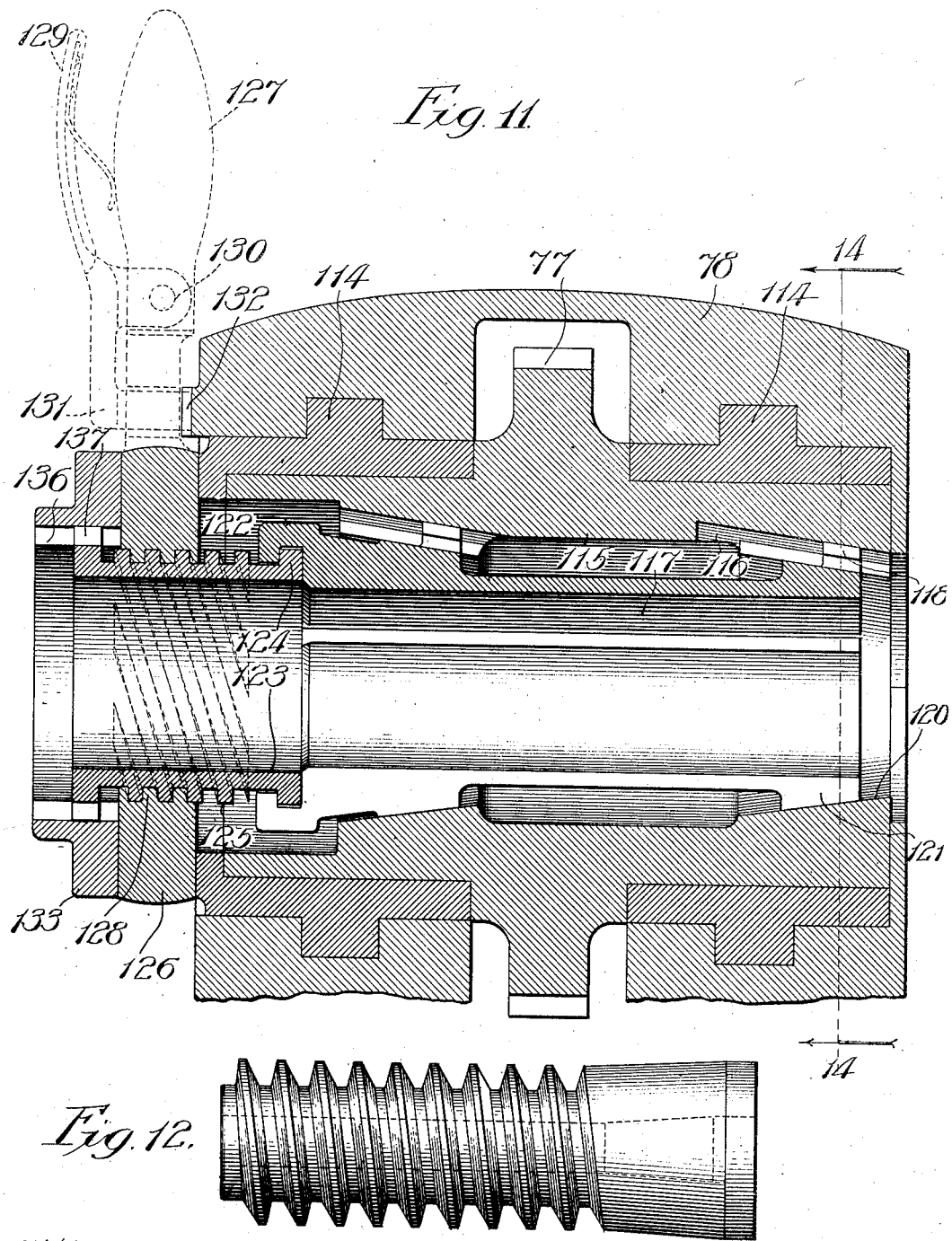

Referring to the drawings—Fig. 1 is a front elevation of the complete machine. Fig. 2 is a vertical section taken on the line 2, 2 of Figs. 3 and 5. Fig. 3 is a top plan view. Fig. 4 is a front elevation partly in section on the line 4, 4 of Figs. 3 and 5. Fig. 5 is an end elevation viewing the machine from the right, as shown in Fig. 1. Fig. 6 is a cross section on the line 6, 6 in Figs. 1, 2 and 3. Fig. 7 is a cross section on the line 7, 7 of Figs. 1, 2 and 3. Fig. 8 is a section on the same line as Fig. 7, but showing the mechanism in a different position. Fig. 9 is an end view from the left as the machine is shown in Fig. 1. Fig. 10 is a section on the line 10, 10 of Figs. 1, 2 and 3. Fig. 11 is an enlarged detail section on the line 11, 11 of Fig. 3. Fig. 12 is an elevation of the screw plug made by the machine. Fig. 13 is an end elevation of the apparatus shown in Fig. 11, as viewed from the left. Fig. 14 is a cross section on the line 14, 14 of Fig. 11. Fig. 15 is a detail sectional view on the line 15, 15 of Figs. 3 and 6. Fig. 16 is a perspective view of an element of the structure more fully described hereinafter. Fig. 17 is a detail vertical section on the line 17, 17 of Figs. 1 and 3.

The machine comprises a main frame 22 cast integrally with the legs 20 and 21. At one end is the extension frame 23 attached to the main frame 22 by means of bolts 24. The frame 22 carries two journal bearing blocks 25 and 26 covered, respectively, by the caps 29 and 27, which are secured in place by the respective bolts 30 and 28. The journal bearings referred to have the Babbitt metal linings 32 and 33, in which is mounted the shaft 31. This carries a double driving pulley 34—35 secured on the shaft by means of the key or feather 38. This shaft 31 also carries two gear wheels 36 and 37, also secured by the same key 38. The smaller gear wheel 37 is in engagement with the gear wheel 39 keyed to the shaft 40 (see Fig. 2). This shaft 40 is mounted in the Babbitt metal linings 41 and 43, the frame 22 having a boss 42 to support the linings 43. At its end the shaft 40 has a head 44 which holds it against longitudinal displacement. The shaft 40 carries another gear wheel 46, secured by means of the adjacent collar 45. A hole 47 (see Figs. 2 and 9) is left in the extension frame 23 to facilitate introducing or withdrawing the shaft 40. The gear wheel 46 transmits power through the idler 79 (see Fig. 10) to the gear wheel 80, mounted on a shaft 81. The shaft 81 carries other driving mechanism at its right hand end, as shown in Fig. 15, which will be described later. The gear wheel 80 transmits motion to the gear wheel 77, which will be more fully described later.

The gear wheel 36, on the main driving shaft 31, engages the gear pinion 48 on the shaft 49 (see Fig. 4). This shaft 49 is fixed in the two standards 29 and 54 and its end is provided with a head 52, between which and the standard 29 is mounted the sleeve 50. The gear wheel 48, already mentioned, and another gear wheel 51 are both secured on the sleeve 50 by means of the key 53.

A rectangular frame comprising the sleeve 57, the radially projecting arms 55 and 56 and the sleeve 60 connecting their ends, is rotatably mounted on the shaft 49 by means of the Babbitt metal linings 58 and 59. Within the sleeve 60 of this frame is mounted the rotatable shaft 63 in the Babbitt metal linings 61 and 62. This shaft 63 carries a cutter 65 at one end and a long gear pinion 64 at the other end in engagement with the gear wheel 51. It will be observed on looking at Figs. 4, 7 and 8 that the frame 55—56—57—60 has a limited movement of rotation around the shaft 49 and can also be displaced lengthwise on said shaft. A cam plate 177 (see Figs. 7, 8 and 16) is bolted to the upper part 179 of the frame 22 by means of the stud bolts 178. The cam plate 177 has the longitudinal grooves 180 and 182, between which is the projecting member 183, cut short at its ends, as shown in Fig. 16. The frame 57—60 has a stud 181' which is adapted to project into one of the grooves 180 and 182. Thus it will readily be seen that the said frame can have an oscillatory movement about the axial shaft 49 only when the stud 181' is at one end or the other of the projecting tongue 183, and that if the said frame is given a longitudinal movement, this can take place only with the stud 181' in one or the other of the grooves 180 and 182. The frame 57—60 is normally held to the left in Fig. 4 by means of the spring 66, which extends between the pillar 54 and the stud 67. The tension of this spring may be adjusted by means of the thumb nut 68. An arm 69 projects down from the frame 57—60 and has a semi-cylindrical screw threaded cup 70 on its lower end adapted to engage the screw threaded shaft 71. This shaft 71 has its end journaled in the pillars 72 and 76. It carries a gear wheel 73 (see Fig. 10) at its end which receives driving power from the gear wheel 77, already mentioned, through the idler 74 mounted on the stud 75 within the pillar 76 (see Fig. 2). This pillar is shown more in detail in Fig. 11, its top being covered by the cap 78.

I will now describe the mechanism for supporting the stock and feeding it up to be worked upon.

The extension frame 23 supports a large horizontal cylinder 82, closed at the left by the screw cap 83 and having the horizontal guide slots 84 on its sides. A treadle 85 is mounted on the end of the lever 86, which is keyed to the cross shaft 89 in the boss 90 in the lower part of the frame member 21. The plate 88 (see Fig. 10) attached to the member 21 has ratchet teeth 87, and the lever 86 has enough lateral flexibility so that the edge of the treadle 85 can be caught on these teeth 87 or disengaged therefrom by means of the foot of the operator. The other end of the cross shaft 89 carries an arm 91, to the end of which the link 93 is attached by means of the bolt 92. The upper end of the link 93 is attached by means of the bolt 94 (see Fig. 9) to the end of the crank arm 95 that projects from the cross shaft 97 mounted in the frame webs 23. The cross shaft 97 also carries upwardly projecting arms 98 at its ends which have slots 98' at their upper extremities. These slots 98' lie adjacent to the horizontal guide slots 84. In each guide slot 84 is mounted a block 99' (see Fig. 17) from which a stud 99 projects into the respective slot 98'. Within the cylinder 82 is a collar 100 having a circumferential groove 101. Studs 100' project into this groove 100 from the inner faces of the sliding blocks 99'. Thus it will be seen that a push down on the treadle 85 will shift the collar 100 to the right. The spring 96 (see Fig. 2) will return the collar to the left when the treadle 85 is released from the ratchet 97. Within the cylinder 82 is another collar 102 having dogs 103 pivoted to inwardly projecting lugs 104, as shown in Fig. 2. Each dog 103 has a point 105 adapted to engage the round piece of stock 184; each dog 103 also has an inclined shoulder 106 adapted to be engaged by the inwardly projecting shoulder 107 on the ring 100. It will at once be apparent that when the ring or collar 100 is pushed to the right, by means of the treadle 85, this will force the points 105 of the dogs 103 into the wooden stock 184 and will carry the stock 184 to the right. When the spring 96 is allowed to return the collar 100 to the left, the pressure on the dogs 103 will be released and the collar 100 will push the collar 102 to the left.

The right hand end of the cylinder 82 is closed by the end wall 108, except for a central hole to allow the stock 184 to pass through. Beyond the wall 108 is an extension chamber closed at the end by the screw cap 109. Within this chamber is the bushing 110, carrying dogs 112 pivoted to inwardly projecting lugs 111. Leaf springs 113 act continuously on the dogs 112 to push them into the wooden stock 184. These dogs 112 hold the stock 184 from slipping back to the left when the treadle 85 is being raised.

As already stated, the gear wheel 77, within the web 78 at the top of the pillar 76, is rotated continuously through the chain of gears traced as follows: from the main drive shaft 31, gear wheel 37, gear wheel 39, shaft 40, gear wheel 46, idler 79, gear wheel 80, gear wheel 77. As shown in Fig. 11, this gear wheel 77 is part of the cylinder 115. The ends thereof are journaled in the Babbitt metal linings 114. The inner face of the cylinder 115 has three pairs of inclined grooves 116. There are three clamping segments 117 each of which has two projecting lugs 118 in engagement with the respective pair of grooves 116. It will at once be apparent that a movement of a segment 117 to the right will also shift it inwardly toward the axis. Adjacent to the lugs and grooves 118 and 116 are the inclined guide surfaces 121 and 120. At the left hand end each segment 117 has an inturned annular lip 122, which is engaged by the outwardly directed flange 124 on the end of the cylinder 123. This cylinder 123 has a plurality of steep external screw threads 125 in engagement with the internal screw threads 128 on the surrounding ring 126. A handle 127 projects radially from the ring 126. The cap 78 and the upper end of the pillar 76 have ratchet teeth 132 arranged in an arc of circumference beside the ring 126. A locking pawl 131 pivoted on the handle 127 at 130 is adapted to engage these ratchet teeth 132. The pawl can be withdrawn by means of the member 129 adjacent to the handle 127. Adjacent to the ring 126 is the collar 133, which has two opposite projecting ears 134. Stud bolts 139 (see Fig. 4) project from the side of the pillar 76 and the cap 78 thereon and pass through holes in the lugs 134. The nuts 138 and 135 on the bolt 139 serve to hold the collar 133 in definite spaced relation so as to form a restraining guide for the ring 126. Longitudinal grooves 136 in the collar 133 are engaged by the tongues 137 on the cylinder 123, thus preventing it from rotation when it is moved longitudinally by the rotation of the handle 127. Thus it will be seen that after the stock 184 has been fed to the right to the desired position by means of the treadle 85, then it can be clamped in such position by rotating the handle 127 and thus causing the segments 117 to engage the stock 184. The knife 143, attached to the end of the lever 141 pivoted on the boss 140, may be applied to cut off the screw plug when it is completed, by pulling it up by the handle 142.

As already explained, the shaft 81 is driven from the gear wheel 80 within the pillar 76. At its right hand end, the shaft 81 carries the loose gear wheel 144 with a clutch member 170 integral therewith. The gear wheel 144 transmits power through the idler 145 to the gear pinion 146 mounted on the shaft 157. The gears 144 and 145 are inclosed within a casing formed by the integral frame wall 162 (see Fig. 2) and a detachable plate 163. The shaft 157 receives rotary movement from the gear pinion 146 through the key or feather 161, but the shaft 157 can slide longitudinally within the lining 158.

A lever 147 is mounted at the front of the machine on the cross shaft 150. This lever 147 can be locked in any desired position by means of the pawl 149 engaging the toothed quadrant 148. An arm 151 (see Figs. 1 and 5) projects upwardly from the cross shaft 150, its forked extremity 152 having slots which engage the studs 154 on the collar 153 loosely mounted on the shaft 157 between the fixed collars 155 and 156. Thus it will be seen that by means of the hand lever 147, the shaft 157 can be shifted longitudinally. At its end, this shaft 157 has a socket 159 adapted to receive the auger or boring tool 160. The base of this auger 160 is modified to form a reamer 160'. When the shaft 157 is shifted to the right, it draws the auger 160 back within the boss 158'. The horizontal lever 164 (see Fig. 3) pivoted at 165 has a fork 166 at its end engaging the grooved collar 167. This collar 167 is mounted upon the shaft 81 and a feather 169 is provided so that the rotation of the shaft 81 rotates the collar 167 while permitting longitudinal displacement of the collar 167 along the shaft 81. The collar 167 has a clutch member 168 adapted to engage the clutch member 170 on the gear wheel 144. Thus by means of the clutch 168—170, controlled by the hand lever 164, the auger 160 can be driven or not, as desired.

The frame 57—60 and its relation to the guide plate 177 have already been described. The depending arm 69 of this frame 57—60 has a cam 175 at its lower end adapted to be engaged by the lower end 173 of the bell crank lever, whose other end terminates in the handle 171. This bell crank 171—173 is pivotally mounted on the stud 172. The tension spring 176 acting on the arm 69 normally holds the frame 57—60 in the position shown in Fig. 7, and the tension spring 174 acting on the bell crank 171—173 holds the said bell crank in the position shown in Fig. 7. But a downward push on the handle 171 shifts the parts to the position shown in Fig. 8.

Having described the structure of the machine, I will now describe how it operates. The stock 184 is introduced axially within the cylinder 82, as shown in Fig. 2. At starting, the lever 147 will be pulled up so as to draw the auger 160 over to the right within the shell 158. Also the cutter 65 will be swung away from the stock 184, the parts having the positions shown in Fig. 7. By working the treadle 85, the stock 84 will be pushed to the right until its end strikes against the boss 158'. Then the short handle 127 will be swung around, causing the segments 117 to tightly clamp the stock 184. Immediately the stock will begin to rotate, the segments 117 being carried around by the gear wheel on the cylinder 115. The operator will next throw the lever 164, thus causing the clutch 168—170 to engage and thus causing the shaft 81 by its rotation to also rotate the auger 60. It will be observed on tracing the gearing that the rotation of the auger 160 will thus be in the opposite direction to the rotation of the stock 184. Next the operator will push down on the lever 147, thus shoving the auger to the left and causing it to bore an axial hole into the end of the stock 184. The reamer 160 will ream out the end of the hole to the form shown in Fig. 12. After the hole has been bored by the auger 160, the operator will release the clutch 168—170, thus permitting the auger 160 to stand motionless in the hole in the stock 184. Up to this time, the frame 57—60 will have been in a position shown in Fig. 7 being held this way by the spring 176. Moreover, the spring 66 will hold the frame at the left as viewed in Fig. 4. The operator will now push down on the handle 171, thus pushing the frame 57—60 into the position shown in Fig. 8. In this movement, the projection 181' will sweep in the arc of a circle past the left hand end of the tongue 183 on the plate 177. All the time the screw threaded shaft 71 will be rotating continuously, and also the cutter 65 will be rotating continuously. When the parts reach the position shown in Fig. 8, the screw threaded cup 70 on the lower end of the arm 69 will engage the screw threaded shaft 71 and the frame 57—60 will be traversed to the right. Inasmuch as the stock 184 is rotating all this time, the effect will be for the cutter 65 to cut a screw thread on the stock as shown in Fig. 12. As the frame 57—60 moves to the right, the cam 175 on the lower end of the arm 68 will escape from the end 173 of the bell crank 171—173. But before this occurs, the projection 181' on the frame 57—60 will enter the groove 180 on the plate 177, so that while the frame 57—60 moves to the right, it will keep the rotational position shown in Fig. 8. Finally, however, the frame 57—60 will be traversed to the right by the screw 71 until the projection 181' will pass the end of the tongue 183. Immediately thereupon, the spring 176 will come into action and will throw the frame 57—60 over to the position shown in Fig. 7, thus withdrawing the cutter 65 from the stock 184. In this movement of the frame 57—60, the projection 181' will swing past the right hand end of the tongue 183, and then the spring 66 will come into action and will pull the frame 57—60 toward the left, the projection 181' following the groove 182; then the cutter 65 will stand continuously rotating in readiness for another cycle of operation like the one just described. As soon as the cutter 65 jumps away from the stock 184, the operator will withdraw the auger 160 from the stock 184 by raising the lever 147. Then he will pull up on the handle 142, thus causing the knife 173 to press on the rotating stock 184 at the point where the screw thread on the stock was commenced by the cutter 65. This will cut off the finished plug which will drop down below. Thereafter, the operator by means of the treadle 85 will push the stock to the right until the end strikes against the boss 158', as already described, when the same cycle of operation can be repeated.

It will be seen that the machine just described is adapted to accomplish the objects stated at the beginning of this specification. By using this machine, one attendant can make a large number of the screw plugs in a given time. The plugs are finished up ready for use at one operation.

While I have described a particular embodiment of my invention as required by the statute, it will be understood that the structure and mode of operation may be widely varied without departing from the spirit of my invention or from the letter thereof as it is defined in the appended claims.

I claim:—

1. In a device of the class described, a main frame, a secondary frame rotatably and slidably mounted thereon and carrying a cutter, means on the main frame to hold a piece of stock in position to be operated upon by the cutter, a curved track-plate mounted on the main frame, the arc of the curve being struck from the axis of the secondary frame, a longitudinally extending tongue projecting from the track plate, and a projection from the secondary frame adapted to travel around on the sides and ends of said tongue.

2. In a device of the class described, a main frame, means to hold a piece of stock, a frame rotatably and slidably mounted on the main frame, a cam carrying plate having a curved form concentric with the axis of rotation of said second frame for guiding it in its rotary and sliding movements, said second frame carrying a cutter, and means to rotate the cutter and simultaneously rotate the stock.

3. In a device of the class described, a main frame, means to hold a piece of stock, a shaft extending parallel to the stock, a rectangular frame having one side journaled on said shaft and free to slide on said shaft, the opposite side carrying a shaft with a cutter thereon, intermeshing gears on the two shafts, one of said gears being extended in length so as to keep the gears in engagement when the rectangular frame slides on its shaft, means to drive said gears to rotate the cutter, and a cam carrying plate having a curved form concentric with the axis of rotation of said rectangular frame for guiding said frame in its rotary and sliding movements.

4. In a device of the class described, a frame, means to hold and rotate a piece of stock, a secondary frame rotatably and slidably mounted on the main frame, a revolving cutter carried by the secondary frame, interacting guiding elements concentrically disposed with relation to the axis of said secondary frame and attached to the main frame and the secondary frame whereby the cutter can move longitudinally only when adjacent to the stock or widely removed therefrom.

5. In a device of the class described, a main frame, a secondary frame slidably and rotatably mounted thereon, means to hold a piece of stock, a cam carrying plate having a curved form concentric with the axis of rotation of said secondary frame to constrain the movement of the secondary frame in its relation to the stock.

6. In a device of the class described, a main frame, a secondary frame carrying a cutter, means on the main frame to hold a piece of stock to be operated upon by the cutter, a cam carrying plate having a curved form concentric with the axis of rotation of said secondary frame and mounted on the main frame, and a projection from the secondary frame engaging said cam carrying plate, the relation of the projection and the cam carrying plate being adapted to constrain the cutter in its movement with respect to the stock.

7. In a device of the class described, a main frame, a secondary frame rotatably and slidably mounted thereon and carrying a cutter, means to hold a piece of stock in position to be operated upon by the cutter, a cam carrying plate having a curved form concentric with the axis of rotation of said secondary frame, said plate being mounted on the main frame and having two spaced longitudinal grooves, and a projection from the secondary frame adapted to engage one or the other of these grooves.

8. In a device of the class described, a main frame, a secondary frame rotatably and slidably mounted thereon and carrying a cutter, means on the main frame to hold a piece of stock in position to be operated upon by the cutter, a traversing screw, means on the secondary frame to engage said screw at the same time that the cutter engages the stock, and a cam plate having a groove parallel to the screw and in register with a part of said secondary frame when the frame engages the screw, the movement of the frame caused by said screw introducing said part of said frame into said groove and causing travel along said groove.

9. In a device of the class described, a main frame, a secondary frame rotatably and slidably mounted thereon and carrying a cutter, means on the main frame to hold a piece of stock in position to be operated upon by the cutter, a traversing screw, means on the secondary frame to engage said screw at the same time that the cutter engages the stock, a cam plate having a groove parallel to the screw and in register with a part of said secondary frame when the frame engages the screw, the movement of the frame caused by said screw introducing said part of said frame into said groove and causing travel along said groove, said groove being adapted to hold the parts in said relation except when the secondary frame is at the extreme positions of its travel, means actuated by the operator for effecting engagement of said secondary frame with said traversing screw at one end of said travel, and automatic means for disengaging said parts at the other extreme of said travel.

10. In a device of the class described, a main frame, a secondary frame slidably and rotatably mounted thereon and carrying a cutter, means on the main frame to support a piece of stock in position to be operated upon by the cutter, a screw traversing shaft, a member on the secondary frame adapted to engage said shaft when the cutter engages the stock, a curved plate concentric with the axis of rotation of said secondary frame having a guide adapted to hold the parts in such relation except when the secondary frame is at the extreme positions of its slidable movement, and a spring adapted to withdraw the secondary frame when it reaches either of such extreme positions of its slidable movement.

11. In a device of the class described, a main frame, a secondary frame rotatably and slidably mounted thereon and carrying a cutter, means on the main frame to hold a piece of stock in position to be operated upon by the cutter, a traversing screw, means on the secondary frame to engage said screw at the same time that the cutter engages the stock, a cam plate having a groove parallel to the screw and in register with a part of said secondary frame when the frame engages the screw, the movement of the frame caused by said screw introducing said part of said frame into said groove and causing travel along said groove to the opposite extreme of its slidable movement, a spring adapted to withdraw said secondary frame when it reaches such opposite extreme, and a hand lever to push the secondary frame over against the spring into engagement with said screw and into register with said groove.

In testimony whereof, I have subscribed my name.

JOHN W. KENDRICK.

Witnesses:
F. H. APPLETON,
B. R. SWORD.